June 20, 1967    H. E. HENJUM    3,327,308

INFLATABLE FRAMEWORK FOR PASSIVE SATELLITES

Filed Nov. 30, 1964    2 Sheets-Sheet 1

INVENTOR.
Harvey E. Henjum
BY
Richard J. Miller
Atty.

June 20, 1967  H. E. HENJUM  3,327,308
INFLATABLE FRAMEWORK FOR PASSIVE SATELLITES
Filed Nov. 30, 1964  2 Sheets-Sheet 2

INVENTOR.
Harvey E. Henjum
BY
Richard J. Miller
Atty.

United States Patent Office 3,327,308
Patented June 20, 1967

3,327,308
INFLATABLE FRAMEWORK FOR PASSIVE SATELLITES
Harvey E. Henjum, Akron, Ohio, assignor, by mesne assignments, to the United States of America as represented by the Secretary of the Navy
Filed Nov. 30, 1964, Ser. No. 414,930
4 Claims. (Cl. 343—18)

The present invention relates to a communication satellite and more particularly to a large passive communication satellite which reflects electromagnetic energy to the surface of the earth.

The usual approach to a passive communication satellite is to design a sphere or satellite body having specular reflectivity. Under idealized conditions such a sphere has isotropic reflective characteristics; for obvious reasons, such reflective patterns are wasteful of the energy impinging upon the satellite. It is possible, of course, to have a relatively small, specular reflector if such a reflector is provided with a space orientation or attitude control system. Such systems, however, have the extreme added disadvantages of undesirable complexity and excessive weight.

It is an object of the present invention, therefore, to provide a new and improved passive communication satellite.

Another object of the present invention is to provide a passive communication satellite having a light weight frame of inflatable pressure members.

Still another object of the present invention is to provide a communication satellite adapted for an orbital path and having an electromagnetic reflective skin supported by a plurality of inflatable tubes and means for inflating said tubes when the satellite has reached orbit.

Yet another object of the present invention is to provide a passive communication satellite with a frame of inflatable pressure members supporting directive and discontinuous reflective means.

Other objects and advantages of the present invention will become apparent from the following description and claims in connection with the accompanying drawings, in which:

The purpose of a passive communication satellite is to reflect radiation from a transmitter on the surface of the earth so that it may be received by a number of stations which could not otherwise receive the direct radiation of the transmitter due to the curvature of the earth and other limiting phenomena. A practical communications system requires relatively high transmitter power, large antennae and quite a large satellite. For example, the Echo I satellite is a specular reflecting sphere of 100 feet diameter. However, isotropic reflection is very wasteful of the energy which impinges on a satellite. Of course, if an attitude control system were included, the reflection characteristics could be optimized with a substantialy smaller reflector. Such attitude control system, however, have the added disadvantages of complexity, cost and maintenance.

A satellite could be either a specular reflector, which means controlling the phases of the returning reflected waves, or a diffuse scatterer which means randomizing the phases of the returning waves. The requirements of no attitude control, a steady signal, and a simple configuration lead to only one aspect of a specular reflector; the sphere. Since specularly reflecting spheres have no directiveness, directive reflectors must be of the diffuse type.

Figure 3:
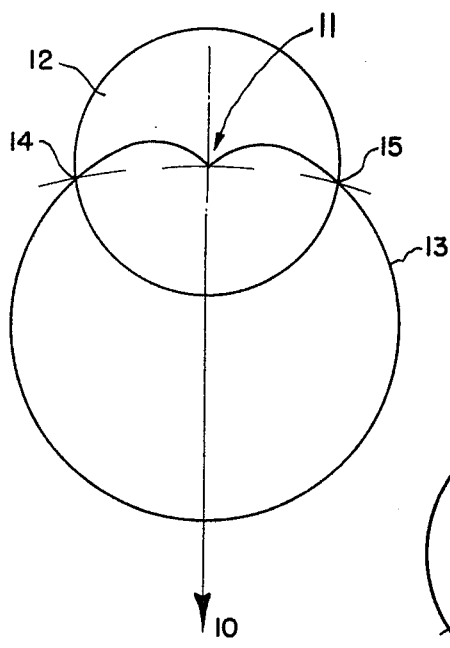
FIGURE 3 is a graphic comparison of several different reflective patterns.

A satellite of high directivity, in accordance with the present invention, consists of a spherical array of randomly phased scatterers whose individual scattering characteristics are approximately similar to the desired characteristics of the satellite. Scatterers which are large relative to the wavelength of energy reflected, having a radius of ⅓ lambda or more, generate a nearly isotropic pattern but their interaction cannot be neglected when they are closely spaced. In such cases, the scattering characteristic is defined approximately by Lambert's cosine law which states that the radiant intensity of a plane surface patch falls off as the cosine of the angle between the normal to the surface patch and the direction of the reflected ray. A derivation of the characteristic of the diffusely reflecting sphere was given by H. N. Russell in the Astrophysical Journal of 1916. The result of this analysis was modified so an expression for the scattering area was obtained:

$$\sigma = \frac{8\rho^2}{3}[\sin A + (\pi - A)\cos A]$$

Where $\rho$ is the radius of the sphere and A is the angle between the normal to the surface and the direction of reflection. In comparison to this the scattering area of the specualry reflecting sphere is $\sigma_s = \pi\rho^2$. A polar plot of these two formulae for the same size of sphere is shown in FIGURE 3. The arrow indicates the direction of the transmitter and the point, designated generally at 11, represents the satellite. The line 12 represents the plot of the specularly reflecting sphere and line 13 the plot of the sphere reflecting according to Lambert's law. It is apparent that an appreciable gain over the specularly reflecting sphere exists up to points 14 and 15 which represent an angle of 83.7 degrees. Thus, a diffusely reflecting sphere whose surface reflectivity obeys Lambert's law has directivity for a wide beam range.

Figure 4:
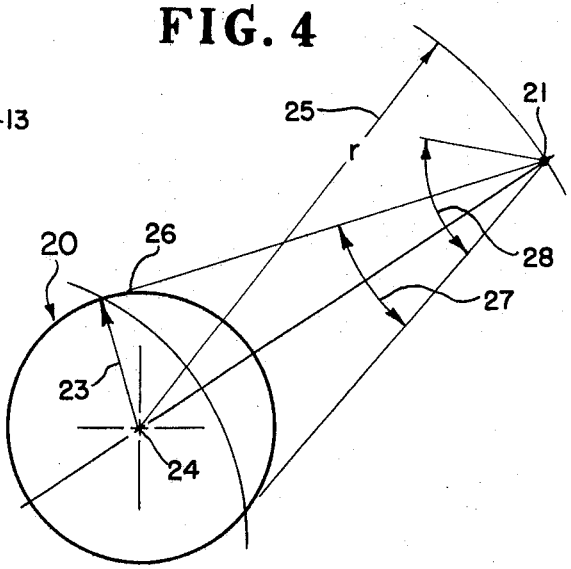
FIGURE 4 is a diagrammatic view showing a communication satellite and its position relative to the earth.

Referring to FIGURE 4 there is shown a representation of the geometrical relationship between the earth, designated generally at 20, and an orbiting satellite 21. The numeral 23 represents the earth's radius and 24 represents the center thereof. The orbital radius is represented at 25. In order to acquire an adequate and uniform pattern of reflection which is independent of the attitude of satellite 21, the pattern must be axially symmetrical with respect to the direction of the transmitter 26 shown at an arbitrary position. Therefore, patterns are not feasible which extend only over the solid angle 27 subtended by the earth, unless the transmitter is directly in the center of this angle. If the transmission may originate at any position on the segment of the earth which is visible from the satellite and if the pattern must cover the entire visible segment, the diameter of the pattern must be twice as wide as the angle subtended by the earth. Therefore, the idealized pattern is represented by the angle 28 having a value twice that of subtended angle 27.

Figure 5:
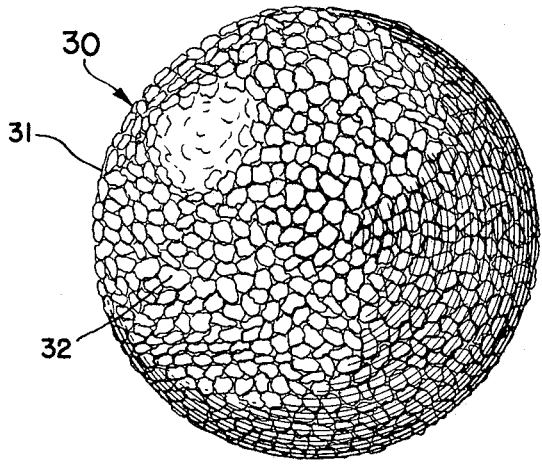
FIGURE 5 is a partial view showing one embodiment of the reflective material of the satellite.
Figure 6:
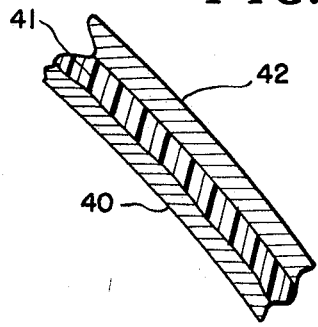
FIGURE 6 is a fragmentary sectional view along line 7—7 in FIGURE 2.

FIGURE 5 shows a satellite, designated generally at 30, constructed in accordance with the present invention and comprising a spherical array of small spheres 31 referred to as a blister skin. It can be fabricated from two sheets of Mylar or polyethylene material, indicated at 40 and 41 in FIGURE 6. For good reflectivity outer layer 41 is overlaid with a highly reflective covering 42, such as ¼ mil aluminum foil. Layers 40, 41, and 42 are sealed along an irregular network of lines 32, in FIGURE 5 to define pockets which may be expanded by suitable means to semispherical shape. As indicated, each small hemisphere constitutes a nearly isotropic scatterer because the radius is still large compared to the wavelength. Further, the phase is randomized and the density of visible spheres is independent of the viewing angle as it increases from the normal to the tangential direction. Thus, there is provided a satellite having directive reflectivity without resorting to attitude control and a shape which does not require a highly precisioned shape.

The approach to th ereflective material requirements for light weight with good radar reflectivity depends on the mission of the satellite. If the satellite is to remain in orbit several months or more, the plastic film must be protected. Aluminum appears to be the best metal for many applications because it is commercially available for vacuum deposition and, as a thin foil, it is an excellent electromagnetic reflector and has good mechanical properties including the ability to be packaged and deployed without damage.

It should be noted that a continuous metal surface is not required for radar reflectivity. A conductive screen or net is a satisfactory radar reflector if the ratio of the mesh or hole size compared to the wavelength is sufficiently large. Therefore, the reflecting surface can be made of wire netting. For example, a 2-mil diameter aluminum wire net, assembled 8 wires per inch is about 97% open but will reflect almost 100% of the energy whose wavelength is 3 centimeters or longer.

Figure 1:
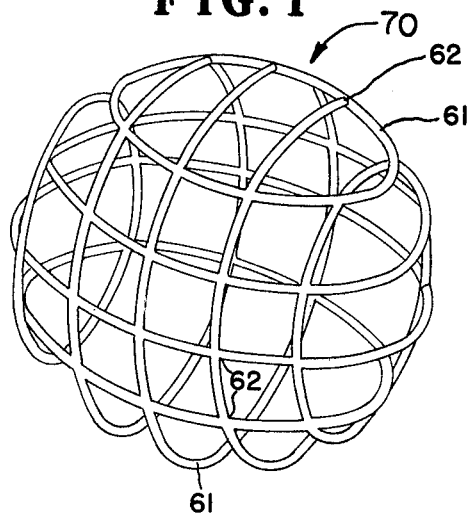
FIGURE 1 shows an embodiment of the inflatable pressure members of the present invention.
Figure 2:
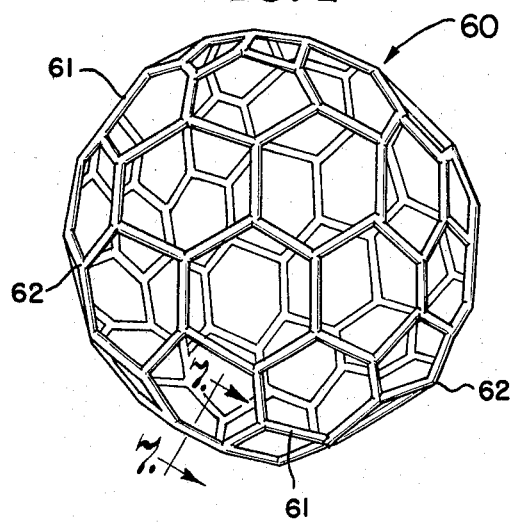
FIGURE 2 shows another embodiment of the pressure members.
Figure 7:
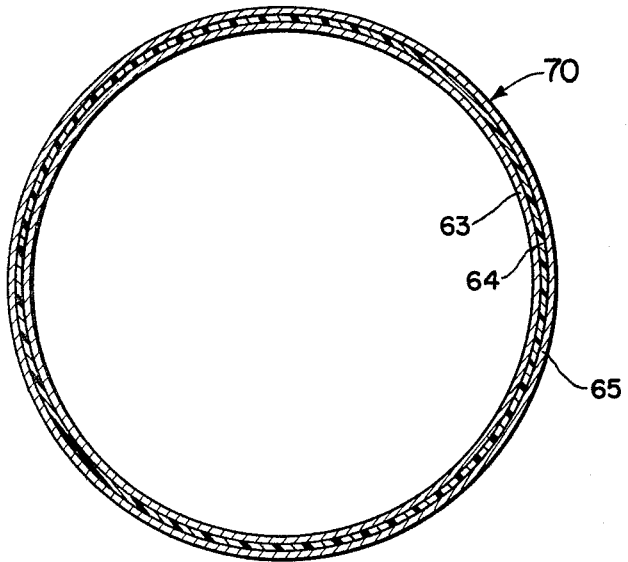
FIGURE 7 is a sectional view showing the construction of a pressure member.

In conjunction with the wire skin an extremely light weight deployment technique is available in accordance with the present invention to make a large passive satellite even more practical. Completely inflating a spheroid requires a completely gas-tight surface and considerable weight of inflation gas. A much lighter satellite can be erected by inflating tubular pressure beams constructed to form a lattice work in the shape of a polyhedron 60 or spheroid 70 as shown in FIGURES 1 and 2 respectively. These tubes 61 may be fabricated from a laminated material as shown in FIGURE 7. Preferably, tubes 61 are suitably sealed at junctures 62 by known means. Laminated tubes comprised of plastic and metal layers provide the necessary strength and lightness. As shown in FIGURE 7, preferably, tube 70 is about 4 inches in diameter and laminated from an inner layer of aluminum foil 63, an overlying plastic layer 64, and an outside aluminum layer 65. For lightness the foil may be ¼ mil aluminum and the plastic ¼ mil Mylar or polyethylene. In orbit these tubes have sufficient rigidity to support a wire mesh surface after the internal pressure has been removed.

In this regard, the pressure tubes may be inflated by sublimating material, such as anthraquinone, but this does not result in a controlled inflation rate or permit a complete evacuation of the vapors in the tubes prior to packaging. Therefore, it is advantageous to inflate the tubes from a high pressure gas bottle using a light gas such as helium. The gas flow rate may then be controlled by valving and also allows the tubes to be vented prior to inflating. The gas bottle may be as small as four inches in diameter since the volume of the pressure tubes will only be a few hundred cubic feet.

Obviously many modifications and variations of the present invention are possible in the light of the above teachings. It is therefore to be understood that within the scope of the appended claims the invention may be practiced otherwise than as specifically described.

I claim:
1. Support means for a lightweight communication satellite adapted for an orbital path and having a discontinuous reflective skin, comprising:
   (a) a plurality of interconnecting inflatable tubes having an inner layer, a middle layer and an outer layer adapted for supporting said skin when the satellite is in orbit;
   (b) said tubes being evacuated and arranged in collapsed relation prior to said orbital deployment; and
   (c) means for individually erecting and inflating said tubes to form a lattice work for supporting said reflective skin when the satellite is in orbit.

2. The structure of claim 1 wherein said tubes have a latent rigidity whereby support of said reflective skin is maintained after diffusion of the inflating means.

3. The structure of claim 2 wherein said tubes comprise a laminar construction for lightness and strength including:
   (a) an outer layer of metallic foil;
   (b) an inner layer of polyethylene film intimately bonded thereto; and
   (c) said laminar construction having a latent rigidity capable of supporting said skin after the diffusion of the inflating means and also capable of being arranged in collapsed relation prior to said erection and inflation.

4. A satellite type communications vehicle, comprising:
   (a) a collapsable inflatable support structure having a plurality of individual tubular members constructed for individual inflation, joined together at ends thereof to provide a support structure; and said tubular members being constructed of an inner aluminum layer, a middle plastic layer, and an outer aluminum layer to be capable of being inflated along individual longitudinal axes, and defining with each other a plurality of voids; and
   (b) an electromagnetic reflective element coupled to and disposed about said collapsable structure upon inflation thereof once said device is placed in orbit, having an irregular surface for re-radiating a plurality of received wave lengths of electromagnetic radiation.

References Cited
UNITED STATES PATENTS 3,184,742  5/1965  Cutler _____ 343—18
3,277,479  10/1966  Struble _____ 343—18

RODNEY D. BENNETT, *Primary Examiner.*

J. P. MORRIS, *Assistant Examiner.*